(12) United States Patent
Harms et al.

(10) Patent No.: US 7,905,704 B2
(45) Date of Patent: Mar. 15, 2011

(54) METHOD FOR OPERATING A WIND ENERGY PLANT

(75) Inventors: Ulrich Harms, Hamburg (DE); Detlef Schluter, Lubeck (DE)

(73) Assignee: Nordex Energy GmbH, Norderstedt (DE)

( * ) Notice: Subject to any disclaimer, the term of this patent is extended or adjusted under 35 U.S.C. 154(b) by 908 days.

(21) Appl. No.: 11/764,408

(22) Filed: Jun. 18, 2007

(65) Prior Publication Data

US 2008/0101915 A1    May 1, 2008

(30) Foreign Application Priority Data

Oct. 25, 2006   (DE) .......................... 10 2006 051 352

(51) Int. Cl.
*F03D 7/02*    (2006.01)
(52) U.S. Cl. ............................................. 416/1; 416/147
(58) Field of Classification Search ........................ 416/1
See application file for complete search history.

(56) References Cited

U.S. PATENT DOCUMENTS

| 2008/0206051 | A1* | 8/2008 | Wakasa et al. | 416/1 |
| 2009/0004005 | A1* | 1/2009 | Jeppesen et al. | 416/1 |

FOREIGN PATENT DOCUMENTS

| DE | 33 20 685 C2 | 8/1987 |
| DE | 42 21 783 A1 | 5/1994 |
| DE | 197 39 164 A1 | 4/1999 |
| DE | 103 38 127 A1 | 3/2005 |
| DE | 10 2005 034 899 A1 | 1/2007 |
| EP | 1 286 048 A1 | 8/2002 |
| EP | 1 612 414 A2 | 4/2005 |

OTHER PUBLICATIONS

T. Burton, "Wind Energy Handbook", 1. Edition, Reprint Nov. 2002, p. 484 and 505-507.
E. Samal, "Grundriss der praktischen Regelungstechnik", 1996, 19. Edition, p. 545-547.
K.A. Stol, "Wind Turbine Field Testing of State-Space Control Designs", Sep. 2004.
Heier, Siegfried, "Windkraftanlagen im Netzbetrieb", Teubner, Stuttgart, 1996, ISBN 3-519-16171-0, p. 334.
Lutz/Wendt, "Taschenbuch der Regelungstechnik", Harri Deutsch, 6. Edition 2005, ISBN 3-8171-1749-3, p. 466.

* cited by examiner

*Primary Examiner* — Richard Edgar
(74) *Attorney, Agent, or Firm* — Vidas, Arrett & Steinkraus

(57) ABSTRACT

A method for operating a wind energy plant with a rotor having rotor blades which have an adjustable blade pitch, characterized in that the adjustment of the blade pitch takes place with an adjustment velocity and/or an adjustment acceleration, wherein the magnitude of the adjustment velocity and/or the magnitude of the adjustment acceleration is depending from a desired value and an actual value of the blade pitch.

8 Claims, 3 Drawing Sheets

METHOD FOR OPERATING A WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for the control of the blade pitch of a wind energy plant.

It is known to control the blade pitch in wind energy plants. In doing so, each rotor blade is shifted around its longitudinal axis in its blade pitch. At different blade pitches, the rotor blade takes out another moment from the wind at a time. The blade pitch control is particularly important in the full load operation, in which the control of the rotational number of the rotor takes place via the blade pitch.

Due to the continuously occurring variations of the velocity and of the direction of the wind, the blade pitch is continuously traced and adapted to a desired value preset by the operation management.

The blade adjustment of modern wind energy plants is driven via an ac motor, which is controlled by a converter. A proper drive can be assigned to each rotor blade. The motor acts on the rotor blade via a gearbox. Due to the frequent adjustment movements and the high mechanical stress of the blade bearings, the components of the blade adjustment experience a high wear.

From the European patent application EP 1 612 414 A2, the entire contents of which is incorporated herein by reference, a method has become known, in which a sudden downturn of the wind or a rapid shifting of the blade pitch is recognised by means of the trend of the blade pitch preceding a regulating intervention and the wind velocity. Because a sudden decrease of the wind velocity is often followed by an abrupt increase of the wind velocity, an excessive shifting of the blade pitch is avoided in these cases by limiting the shifting of the blade pitch with respect to its velocity or to a minimum blade pitch. By doing so, it is intended to reduce the stress of the rotor blades at a wind gust following a calm, for instance. However, this method does not exert any influence on the adjustment of the rotor blades in the normal operation, i.e, at relatively uniform conditions of operation, which do not require extraordinary large shifting movements.

On the basis of this, it is an objective of the present invention to provide a method for the adjustment of a blade pitch, which is material conserving and which reduces the stress of the components of the blade adjustment.

BRIEF SUMMARY OF THE INVENTION

The present invention is based on the finding that a desired value for the blade pitch, preset by the operation management, is adjusted in a manner worth to be improved by the known blade pitch control units, at small adjustment paths in particular. Usually the rotational number of a drive motor for the blade pitch adjustment is set by the converter concerned with driving the motor. In doing so, the converter takes into account a maximum possible adjustment velocity, which is not exceeded. Up to reaching this maximum adjustment velocity, the rotational number of the drive motor is continuously increased by means of a ramp function. At small deviations from the desired value, this has the effect that the maximum possible blade adjustment velocity is normally not reached, but instead the shifting movement has to be braked down already before reaching this velocity. As a consequence of this, a fast sequence of acceleration and braking processes of the blade pitch adjustment takes place in the operation.

The method according to the present invention serves for the operation of a wind energy plant with a rotor having rotor blades which have an adjustable blade pitch, wherein the adjustment of the blade pitch takes place with an adjustment velocity and/or an adjustment acceleration, and wherein the magnitude of the adjustment velocity and/or the magnitude of the adjustment acceleration is depending from a desired value and an actual value of the blade pitch.

In other words, depending from a desired value and an actual value, an adjustment velocity and/or an adjustment acceleration is preset, at which the blade pitch is uniformly shifted in a portion of time. The preset adjustment velocity or adjustment acceleration may be smaller or equal to the maximum possible adjustment velocity or adjustment acceleration, respectively, of the blade pitch.

In a preferred embodiment of the present invention, the magnitude of the adjustment velocity and/or of the adjustment acceleration is/are kept constant for a portion of time. From this results an uniform or uniformly accelerated shifting movement in this portion of time.

In particular, the dependency of the adjustment velocity and/or of the adjustment acceleration is realised such that it is preset according to the difference between the desired value and the actual value of the blade pitch. The difference between the desired value and the actual value corresponds to an intended shifting path. At small intended shifting paths, the preset adjustment velocity and/or adjustment acceleration is normally significantly smaller than the maximum possible adjustment velocity or adjustment acceleration, respectively.

By presetting an adjustment velocity it is achieved that the shifting movement of the blade pitch occurs much more uniformly than with other blade pitch control systems. The phases of acceleration and braking of the blade adjustment are shortened. The used velocities of the blade shifting are reduced. By doing so, the mechanical stresses of the blade bearings and of the blade adjustment drive, which embraces plural electric motors and gearboxes according to the circumstances, are significantly reduced. A significantly reduced wear results.

Furthermore, even the electric load of the drive motors and of the converters used for driving them, as well as the accompanying energy consumption, can be reduced. Through the less sudden shifting movements, the mechanical stress of the rotor blade is also reduced, because vibrations excited by the shifting movement are avoided, torsional vibrations of the rotor blade in particular.

Alternatively or in addition, even the adjustment acceleration can be preset. Through this, the stress of the wind energy plant can be reduced further, because the occurring accelerations can be adapted to the required adjustment accelerations or adjustment velocities.

In principle, the dependency of the preset adjustment velocity and/or adjustment acceleration from the difference between the desired value and the actual value may take place by means of an arbitrary assignment, which allocates one adjustment velocity and/or adjustment acceleration to each difference between the desired value and the actual value of the blade pitch. In this, the adjustment velocity and/or the adjustment acceleration takes on different values from a preset range of values. For instance, the assignment may correspond to a course with sinus or cosine shape. In a preferred embodiment of the present invention, the adjustment velocity and/or of the adjustment acceleration is proportional to the difference between the desired value and the actual value of the blade pitch up to a maximum value of the difference between the desired value and the actual value. Thus, a particularly advantageous dependency of the adjustment velocity from the intended shifting path is given, because in this case the shifting movement performed per time unit is proportional to the intended shifting path.

In a further preferred embodiment of the present invention, the adjustment velocity and/or the adjustment acceleration exhibit an essentially square dependency from the difference between the desired value and the actual value of the blade pitch up to a maximum value of the difference between the desired value and the actual value. Through this, an effective suppression of erroneous shifting movements is achieved in the region of small differences, which otherwise might result from a noise of the difference between the desired value and the actual value. As a whole, the adjustment of the blade pitch occurs more smoothly. However, in the region of greater differences, a higher adjustment velocity and/or adjustment acceleration is preset, so that the necessary shifting movements are performed sufficiently fastly.

Preferably, the presetting of an adjustment velocity and/or of an adjustment acceleration takes place in a constant clock cycle and the adjustment velocity and/or the adjustment acceleration for a time interval is selected such that at the end of the time interval, the actual value of the blade pitch has not completely reached the desired value acquired at the beginning of the time interval. In particular, the presetting of the adjustment velocity and/or the adjustment acceleration takes place in a manner matched to the clock cycle of the desired values of the blade pitch preset by the operation management in this. In addition, the indicated selection of the adjustment velocity and/or the adjustment acceleration for the respective time interval has the result that the tracing of the blade pitch up to the acquired desired value occurs rapidly enough to substantially reach the desired value within the observed time interval. However, the desired value is not completely reached, so that no sudden braking down of the shifting movement takes place before the end of the time interval, but instead the shifting movement is not yet completed at the of the time interval when the following desired value is preset. Through this, there is a smooth transition into the shifting movement of the next time interval. By doing so, a very material-preserving shifting movement results, which at the same time also follows rapid variations of the desired value in real time.

In a further preferred embodiment of the present invention, in every time interval, the adjustment velocity reaches a preset adjustment velocity in a first portion of time, which is maintained in a second portion of time up to the end of the time interval. Again, the preset adjustment velocity is dimensioned such that the blade pitch has not completely reached the desired value acquired in the beginning of the time interval. As the desired value is not completely reached, the rotor blade is still in its forward movement at the end of the time interval, i.e. when the following desired value for the blade pitch is preset. Based on this adjustment velocity, the adjustment velocity preset for the following time interval is immediately set in the first portion of time of the following time interval. By doing so, an unnecessary braking down of the adjustment velocity at the end of a time interval is avoided, which further reduces the stress of the components of the blade pitch control, According to a further embodiment of the present invention, the blade pitch is adjusted with a preset adjustment acceleration in the first portion of time, which is depending from the difference between the desired value and the actual value of the blade pitch. In principle, the adjustment velocity preset for the second portion of time can be set with a deliberate time course during the first portion of time. Preferably, a preset uniform acceleration comes into consideration. The same can have a fixedly preset value for all the time intervals, for instance. However, this value is preferably depending from the difference between the desired value and the actual value of the blade pitch, i.e. the intended shifting path. In particular, it is provided to reach small preset adjustment velocities with a smaller acceleration. Through this, the load on the system can be reduced another time, even during the acceleration phase.

In a further preferred embodiment, the adjustment of the blade pitch is smoothed by means of a low-pass filter or of a first order delay element. This leads to an additional reduction of the changes of the blade pitch movement. Sudden velocity changes are suppressed, through which the load on the entire system is further reduced.

In a preferred embodiment of the present invention, the adjustment velocity is preset via a rotational number or a travelling velocity of a drive motor for the blade pitch. A particularly simple control of the adjustment velocity of the blade pitch is at hand because the rotational number or the travelling velocity of the drive motor can be preset by the converter concerned with the current supply of the drive motor.

BRIEF DESCRIPTION OF THE SEVERAL VIEWS OF THE DRAWINGS

In the following, the present invention is explained in more detail by means of two examples of its realisation which are depicted in five figures.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated The application of the method of the present invention to a wind energy plant with a rotor having rotor blades which are adjustable in their blade pitch will now be described.

Figure 5:
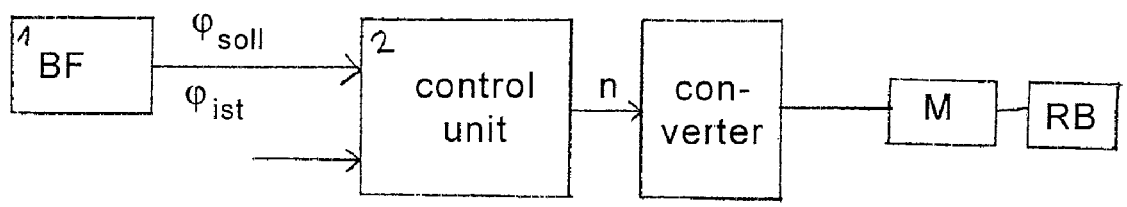
FIG. 5 shows a simplified block diagram of an apparatus for exercising the method of the present invention.

As shown in FIG. 5 in a simplified manner, the blade pitch of a rotor blade 5 (RB) is driven by an ac motor 4 (M), which acts via a not shown gearbox on a toothing in the region of the blade bearing of the rotor blade 5. The ac motor 4 is controlled with the aid of a converter 3. The converter 3 supplies the coils of the ac motor 4 with current and controls the rotational movement of the motor. For the control of the converter 3 serves a control unit 2, which presets a rotational number value n for the converter 3. The control unit 2 determines this rotational number value n in dependency from a desired value $\phi_{soll}$ preset by the operation management 1 (BF) and an actual value $\phi_{ist}$ of the blade pitch. For instance, the actual value can be acquired by a sensor on the rotor blade.

In the most simple case, the control unit 2 consists of a proportional controller, which determines the difference $\Delta\phi$ between the desired value $\phi_{soll}$ and the actual value $\phi_{ist}$ and multiplies it with a suitable factor, in order to determine a rotational number value n corresponding to the desired adjustment velocity v.

In the shown example, the converter 3 is capable to adjust the preset rotational number value n by running through a ramp function. In this, the slope of the ramp function, i.e. the acceleration of the rotational movement, has a fixedly preset value. Alternatively, the slope of he ramp function can also be preset by the control unit 2 in dependency from $\phi_{soll}$ and $\phi_{ist}$ and can be adapted to the magnitude of the rotational number value n.

The presetting of the rotational number value n takes place in a fixed clock cycle, which is preferably coincident with the clock cycle in which the desired value $\phi_{soll}$ is preset by the operation management 1.

Figure 1:
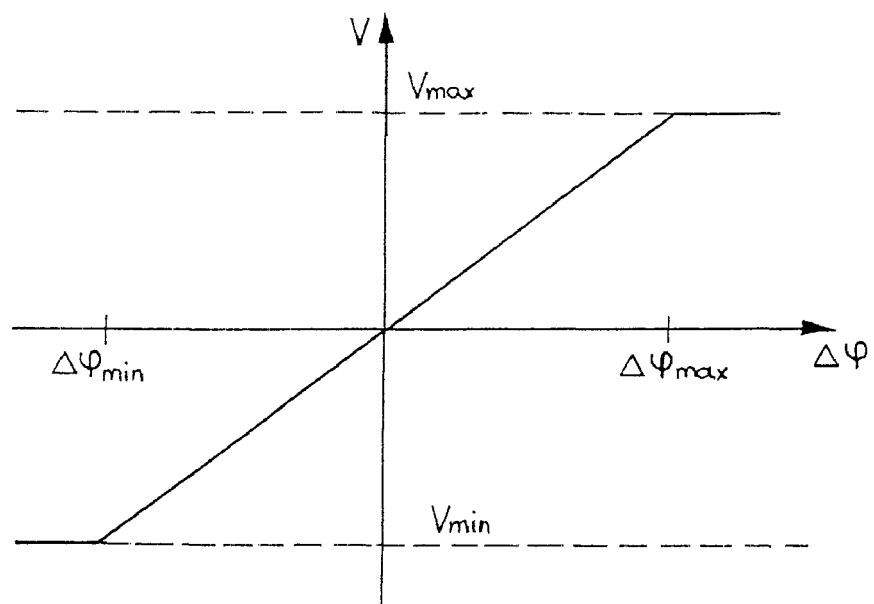
FIG. 1 shows a diagram of the dependency of the preset adjustment velocity v from the difference $\Delta\phi$ between the desired value and the actual value of the blade pitch in a first realisation example of the present invention.

In the diagram shown in FIG. 1, the difference $\Delta\phi$ between the desired value $\phi_{soll}$ and the actual value $\phi_{ist}$ of the blade pitch is plotted on the abscissa. Thus, $\Delta\phi$ represents the shifting path of the blade pitch intended at a point of time. The diagram shows the assignment of an adjustment velocity v of the blade pitch plotted on the ordinate to $\Delta\phi$. The relation is substantially proportional in this first example of realisation. Only when exceeding a maximum value $\Delta\phi_{max}$ or falling below a minimum value $\Delta\phi_{min}$, the adjustment velocity of the blade pitch is limited to a maximum value $v_{max}$ or a minimum value $v_{min}$, respectively. $v_{min}$ and $v_{max}$ result from the maximum possible or reasonable adjustment velocities of the blade pitch in the positive and negative direction, respectively.

Due to the fixed coupling between the ac motor and the rotor blade, each adjustment velocity corresponds to a certain rotational number of the ac motor. The maximum possible adjustment velocity of the rotor blade $v_{max}$ may have a value of 6°/s to 12°/s, for instance, and correspond to a certain rotational number value. The conversion of a velocity value v to be preset in dependency from $\Delta\phi$ into a rotational number value n takes place through application of a corresponding factor within the control unit 2 depicted in FIG. 5.

Figure 2:
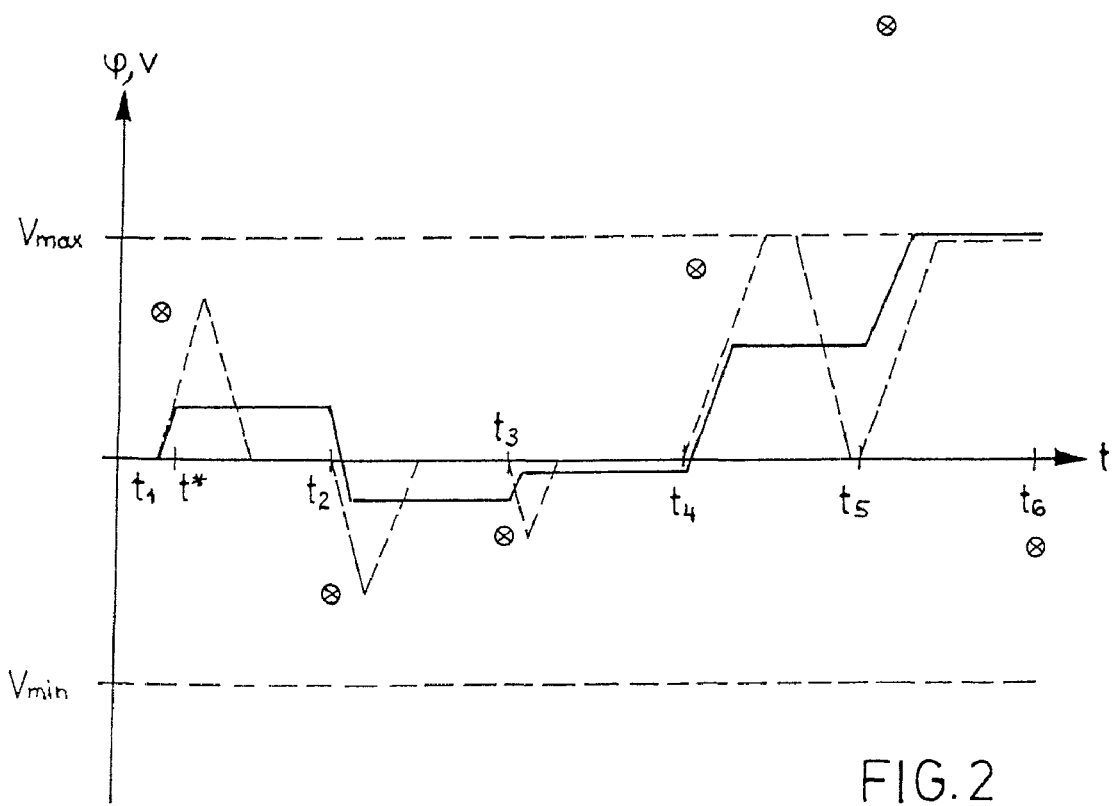
FIG. 2 shows a diagram with the course of the adjustment velocity v of the blade pitch plotted against time, according to the first example of realisation of the present invention and according to the state of the art.

In FIG. 2, the effect of the method according to the present invention on the adjustment velocity v of a rotor blade is plotted versus time in an exemplary manner. Five time intervals between the points of time $t_1$ and $t_6$ are depicted. The solid line represents the course of the adjustment velocity v when using the method according to the present invention. The course of the adjustment velocity of the state of the art is depicted in a broken line. The points depicted as circled crosses at the points of time $t_1$ to $t_6$ designate the differences $\Delta\phi$ acquired from $\phi_{soll}$ and $\phi_{ist}$ at the respective points of time, which describe the intended shifting path of the blade pitch.

Both trend curves proceed within the band preset by the minimum and maximum adjustment velocities $v_{min}$ and $v_{max}$, respectively.

At first, the course of the adjustment velocity when implementing the method of the present invention is described. In the example, the value of $\Delta\phi$ depicted at the point of time $t_1$ is 0.25°. On the basis of this intended shifting path, the control unit calculates an adjustment velocity v of 1.5° per second. This velocity is preset to the converter at the point of time $t_1$ and run up on a ramp function with continuous slope by the same in a first portion of time of the time interval laying between $t_1$ and $t_2$. The endpoint in time of the ramp function is indicated with t* in the FIG. 2. The adjustment velocity v reached in the point of time t* is kept constant up to the point of time $t_2$, as depicted as solid, horizontal line in the diagram. In this, a fixed rotational number value n of the ac motor corresponds to the constant adjustment velocity v again.

At the point of time $t_2$, the acquired difference $\Delta\phi$ is −0.2° in the shown example. From this, the control unit calculates a new presetting for the adjustment velocity v of −1.2° per second. This new velocity value is run up from the converter on a uniformly decreasing ramp function, departing from the velocity value set before, and is consecutively kept constant up to the point of time $t_3$.

In the example, the value of $\Delta\phi$ at the point of time $t_3$ is −0.1°. Then, the converter runs up to the velocity value of v=−0.6° determined by the control unit and keeps the same constant up to the point of time $t_4$.

At the point of time $t_4$, a greater adjustment velocity v preset by the control unit results from a detected $\Delta\phi$ of 0.5°, which is run up on a uniformly ascending ramp function and kept constant up to the point of time $t_5$.

At the point of time $t_5$, a $\Delta\phi$ of 0.5° is detected. This value is above the maximum value $\Delta\phi_{max}$ registered in FIG. 1. Therefore the velocity value v preset by the control unit is limited at this point of time to the maximum value $v_{max}$, which is 6°/s in the example. This maximum value is run up on a uniformly ascending ramp function and kept constant up to the end of the time interval at $t_6$.

In each of the five depicted time intervals, the described curve depicted in solid lines in FIG. 2 has a first portion of time with uniform rise or lowering of the velocity and a second portion of time with constant adjustment velocity. Therefore, the adjustment velocity is changed in each time interval only once by acceleration or braking, respectively. The occurring maximum adjustment velocities are relatively small, because they are selected such that in every time interval, the preset desired value $\phi_{soll}$ is not completely reached at the end of the time interval. The result is a particularly material conserving and energy saving adjustment of the blade pitch. In addition to the reduced wear of the mechanical components resulting from this, the effective electric power and load of the converter and the ac motor are also reduced, so that energy consumption and development of heat can be reduced.

In the following, the course of the blade pitch adjustment when using a method of the state of the art is compared with this advantageous movement course. The course is shown in FIG. 2 as a dashed line.

In the known methods, at the point of time $t_1$ the intended adjustment path $\Delta\phi$ is also calculated at first, which was acquired from the difference between desired value and actual value $\phi_{soll}$ and $\phi_{ist}$ of the blade pitch. The calculated blade pitch adjustment is communicated to the converter essentially through a starting and a stopping command for the shifting movement. However, there is no presetting of a certain value v depending from $\phi_{ist}$ and $\phi_{soll}$. Therefore, the converter runs the adjustment velocity along a firmly preset ramp function as long until it receives the stopping command. The acceleration phase is therefore followed immediately by braking down the shifting movement, when the intended adjustment path Δϕ is reached already before the maximum possible adjustment velocity $v_{max}$ or $v_{min}$, respectively, has been reached. In the depicted example, the same applies for all the time intervals between $t_1$ and $t_4$.

In the case that Δϕ takes on relatively large values, like at the point of time $t_4$ for instance, the maximum value $v_{max}$ for the adjustment velocity is reached even in the known methods and is maintained for a certain time. This is expressed through the horizontal portion of the dashed line in the time interval between $t_4$ and $t_5$. However, as soon as the shifting path Δϕ has been reached, the blade adjustment is instantly braked down again. At very large values of Δϕ, like at the point of time $t_5$, it may also occur that the intended shifting path is not at all reached within the respective time interval, and thus, a shifting takes place with the maximum possible velocity $v_{max}$ up to the end of the time interval. However, in contrast to the present invention, even in this case the constant adjustment velocity is not depending from the value of Δϕ, but is determined only through a preset maximum value of the adjustment velocity $v_{max}$.

As can be immediately seen from a comparison of the two curves shown in FIG. 2, in the state of the art more acceleration and braking down processes are required at small shifting paths Δϕ in particular, and the peak values of the occurring adjustment velocities are substantially higher than in the method of the present invention. Through this, there is a higher wear of all the mechanical components and a higher electric load of the converter and the motor.

Figure 3:
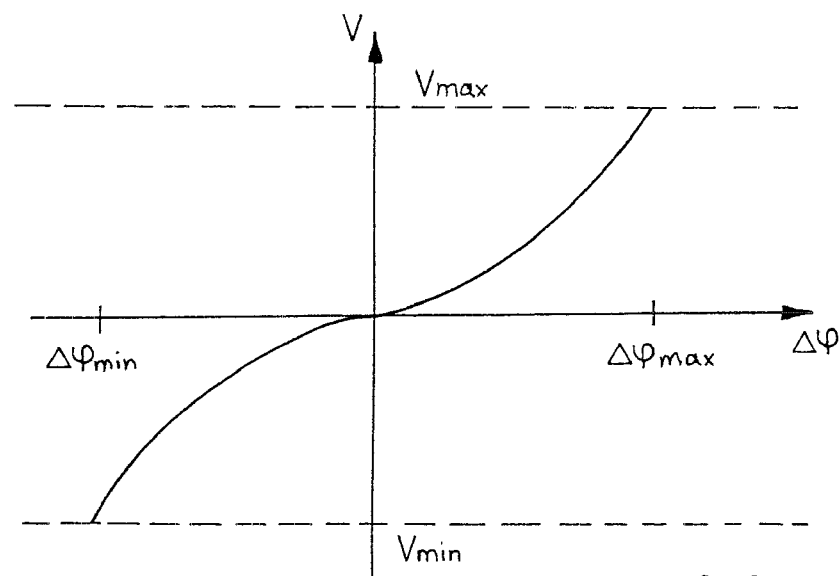
FIG. 3 shows a diagram of the dependency of the preset adjustment velocity v from the difference $\Delta\phi$ between the desired value and the actual value of the blade pitch in a second realisation example of the present invention.
Figure 4:
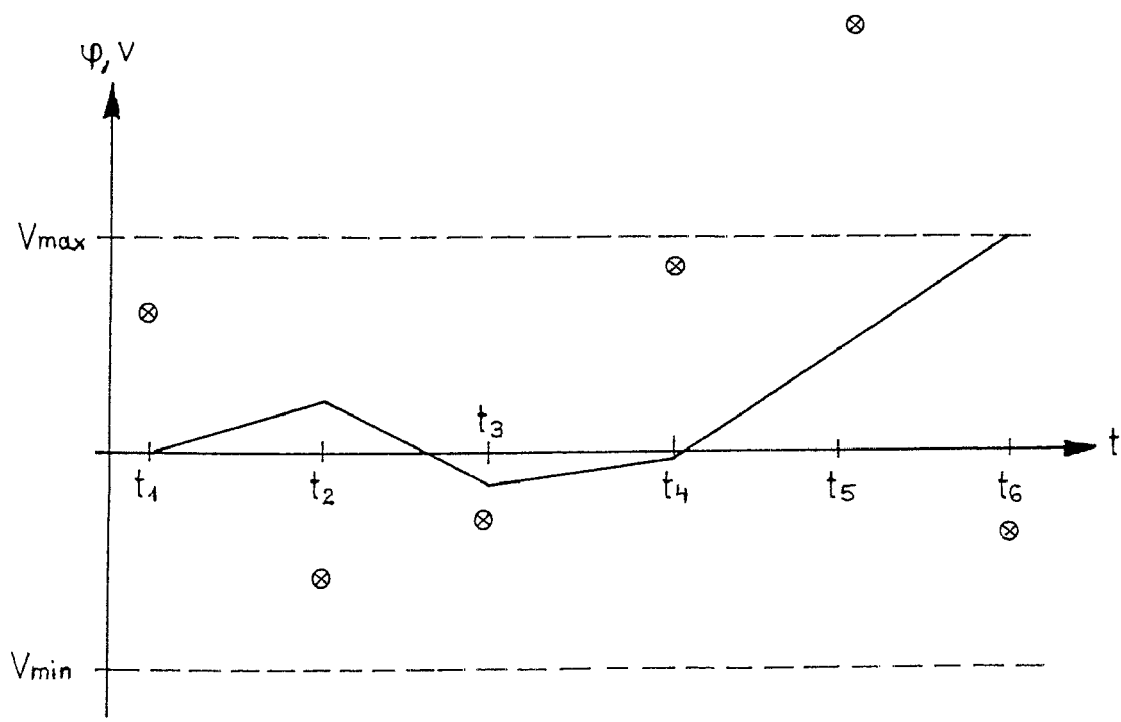
FIG. 4 shows a diagram with the course of the adjustment velocity v of the blade pitch plotted against time, according to the second example of realisation of the present invention

In FIGS. 3 and 4, a further realisation example of the present invention is illustrated. The representation of the diagrams is similar to the corresponding FIGS. 1 and 2 of the first realisation example.

The assignment of the preset adjustment velocity v to the difference Δϕ between actual value and desired value of the blade pitch deviates from the proportional course of FIG. 1. The curve shows an approximately square dependency. The slope of the curve is smaller in the region of small differences than at higher differences. Through this, at small deviation of the blade pitch from the desired value in particular, a slower shifting of the blade pitch is achieved. Above all, this is advantageous at input values affected by noise, at the desired value of the blade pitch in particular.

The dependency of the adjustment velocity depicted in FIG. 3 can be applied in realisations with preset adjustment velocity as well as in realisations with preset adjustment acceleration or with a combination of both.

FIG. 4 shows an example of the realisation of the present invention, in which an adjustment acceleration is preset within each time interval. The adjustment acceleration is acquired from the difference of two consecutive adjustment velocities at a time and is selected such that the acquired desired value of the blade pitch is not yet completely reached at the end of a time interval. Therefore, the acceleration process due to the preset adjustment acceleration which is constant during the time interval passes over immediately into the acceleration process of the next time interval, and so on. In this case, the adjustment velocity is continuously adapted.

Even when presetting the accelerations, which are calculated from the acquired adjustment velocities, the preset value depends from the desired value and the actual value of the blade pitch, which are used for determining the adjustment velocities.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for operating a wind energy plant with a rotor having rotor blades which have an adjustable blade pitch, wherein the wind energy plant is in full load operation in which a control of a rotational speed is performed by setting a desired value of the blade pitch and the adjustment of the blade pitch takes place with an adjustment velocity and/or an adjustment acceleration, wherein the magnitude of the adjustment velocity and/or the magnitude of the adjustment acceleration is depending from the desired value and an actual value of the blade pitch, and presetting of the adjustment velocity and/or of the adjustment acceleration takes place in a constant clock cycle in which the desired values are preset and the adjustment velocity and/or the adjustment acceleration is selected for a time interval such that at the end of the time interval, the actual value of the blade pitch has substantially, but not completely reached the desired value acquired at the beginning of the time interval, so that no sudden braking down of the shifting movement takes place before the end of the time interval, but instead the shifting movement is not yet completed at the end of the time interval.

2. The method according to claim 1, characterised in that the adjustment velocity and/or of the adjustment acceleration is/are kept constant for a portion of time.

3. The method according to claim 1, characterised in that the adjustment velocity and/or of the adjustment acceleration is depending from the difference between the desired value and the actual value of the blade pitch.

4. The method according to claim 1, characterised in that the adjustment velocity and/or of the adjustment acceleration is proportional to the difference between the desired value and the actual value of the blade pitch up to a maximum value of the difference between the desired value and the actual value.

5. The method according to claim 1, characterised in that in every time interval, the adjustment velocity reaches a preset adjustment velocity in a first portion of time, which is maintained in a second portion of time up to the end of the time interval.

6. The method according to claim 5, characterised in that the blade pitch is adjusted with a preset acceleration in the first portion of time, which is depending from the difference between the desired value and the actual value of the blade pitch.

7. The method according to claim 1, characterised in that the adjustment of the blade pitch is smoothed by means of a low-pass filter or of a first order delay element.

8. The method according to claim 1, characterised in that the adjustment velocity and/or the adjustment acceleration for the blade pitch is preset via a rotational number or a travelling velocity of a drive motor or the change thereof, respectively.

* * * * *